United States Patent [19]

Fukuda et al.

[11] Patent Number: 4,729,910
[45] Date of Patent: Mar. 8, 1988

[54] REINFORCED FLEXIBLE GRAPHITE SHEET

[75] Inventors: Hiroyuki Fukuda; Masatomo Shigeta; Hisatsugu Kaji, all of Iwaki; Kuniyuki Saitoh, Abiko, all of Japan

[73] Assignee: Kureha Kagaku Kogyo Kabushiki Kaisha, Tokyo, Japan

[21] Appl. No.: 719,562

[22] Filed: Apr. 3, 1985

[30] Foreign Application Priority Data

Apr. 10, 1984 [JP] Japan .................. 59-71659

[51] Int. Cl.$^4$ .................. B05D 3/02; B05D 3/12
[52] U.S. Cl. .................. 427/294; 427/370; 427/385.5; 428/408; 428/524
[58] Field of Search .................. 427/79–81, 427/113, 294, 350, 370, 385.5, 386; 428/408, 413, 524

[56] References Cited

U.S. PATENT DOCUMENTS 4,409,288 10/1983 Spain .................. 427/386 X
4,555,446 11/1985 Sumida et al. .................. 427/386 X
4,585,698 4/1986 Anzai et al. .................. 427/113 X

FOREIGN PATENT DOCUMENTS 49-42793 11/1974 Japan .................. 427/113
1424894 11/1976 United Kingdom .
2151221 7/1985 United Kingdom .

Primary Examiner—Michael R. Lusignan
Attorney, Agent, or Firm—Cushman, Darby & Cushman

[57] ABSTRACT

Disclosed herein is a reinforced flexible graphite sheet uniformly containing a thermosetting resin prepared by impregnating a flexible graphite sheet with a liquid thermosetting resin having the carbonizing yield of more than 20% under a reduced pressure and thereafter, heat-setting the resin, an amount of the resin impregnated being in the range of 0.5 to 20% by weight based on the flexible graphite sheet.

7 Claims, 1 Drawing Figure

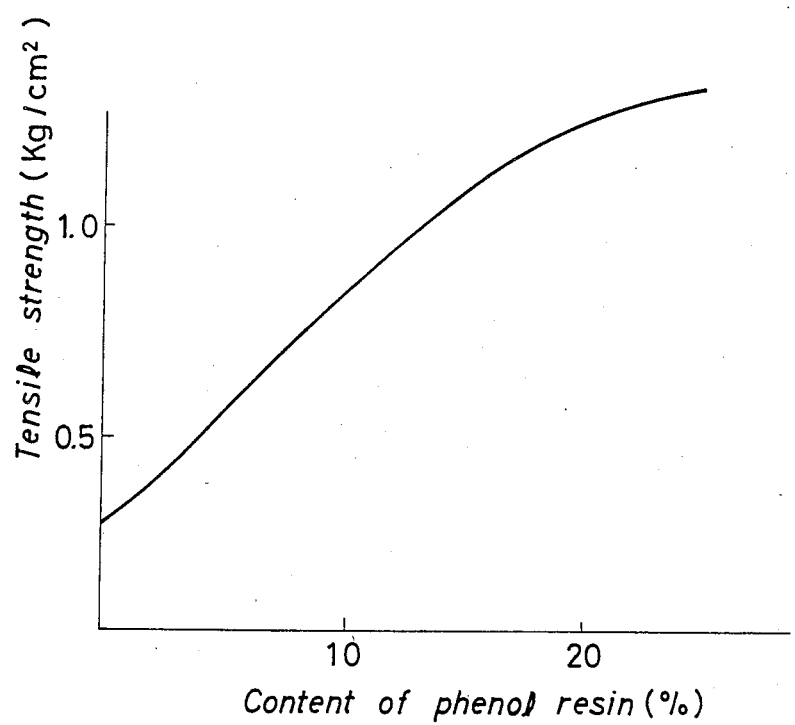

REINFORCED FLEXIBLE GRAPHITE SHEET

BACKGROUND OF THE INVENTION

The present invention relates to a reinforced flexible graphite sheet and, more specifically, relates to a flexible graphite sheet showing improved strength and gas permeability.

Heretofore, expanded graphite sheets have been prepared by compression-molding expanded graphite particles and used for heat-resistant packings, separators for use in fuel cells and the like.

However, since the conventional graphite sheets inevitably have minute hollows between compressed, expanded graphite particles in the sheet, the gas permeability can not be reduced to less than a certain value. Further, when such graphite sheets used, for instance, as a separator for use in fuel cells are in contact with liquid such as phosphoric acid, the liquid gets into the minute hollows, particularly, gaps as mentioned above and in result undesired phenomena of swelling the sheet are caused.

In addition, since the conventional graphite sheets have low scratch hardness, sufficient cares have to be taken upon handling them.

An object of the present invention is to solve the foregoing defects in the prior art.

An another object of the present invention is to provide a flexible graphite sheet having improved mechanical strength and low gas permeability and causing no undesired swelling of the sheet.

SUMMARY OF THE INVENTION

In an aspect of the present invention, there is provided a reinforced flexible graphite sheet having a gas permeability of $0.2 \times 10^{-5}$ to $1.6 \times 10^{-5}$ cm$^2$/sec.-mmAq, a swelling rate of not more than 6 and tensile strength of 0.5 to 5 kg/cm$^2$, which is prepared by impregnating a flexible graphite sheet with a liquid thermosetting resin having the carbonizing yield of more than 20% under a reduced pressure and thereafter, heat-setting the resin, an amount of the resin impregnated being in the range of 0.5 to 20% by weight based on the flexible graphite sheet.

BRIEF DESCRIPTION OF THE DRAWINGS

Appended drawing shows a relationship between the content of a phenolic resin in a flexible graphite sheet and a tensile strength thereof.

DETAILED DESCRIPTION OF THE INVENTION

The reinforced flexible graphite sheet according to the present invention is prepared by impregnating a flexible graphite sheet with a thermosetting resin under a reduced pressure and thereafter, heat-setting the resin.

The flexible graphite sheet used in the present invention may be any of commercially available products and, for instance, GRAFOIL ® (registered trademark, made by Union Carbide Co., Ltd.) can be used.

The liquid thermosetting resin for use in the present invention is phenolic resin adhesives or epoxy resin adhesives having the carbonizing yield of more than 20%. As the phenolic resin adhesives, resol type phenolic resins solved in ketones or alcohols with the resin content of 10 to 30% by weight may be mentioned and as the epoxy resin adhesives, commercially available epoxy resins in liquid state at room temperature may be mentioned. Such a thermosetting resin is preferably impregnated into the flexible graphite sheet within a range of 0.5 to 20% by weight.

Upon practising the present invention, a flexible graphite sheet is at first immersed in a certain amount of the adhesives, for example, phenolic resin thermosetting adhesives (product No. PL-2801, made by Gunei Kagaku Co., Ltd.) contained in a vessel, such that the adhesives cover the entire surface of the sheet.

A better result can be obtained by subjecting the flexible graphite sheet to de-aeration treatment prior to the immersion into the adhesive resin solution. However, the deaeration treatment is not an essential in the present invention but the effect intended in the present invention can also be attained satisfactorily by applying the immersion treatment without de-aeration.

The preliminary de-aeration treatment can be carried out desirably by placing the flexible graphite sheet and a vessel containing the adhesives in a pressure reduction device, subjecting to de-aeration treatment, returning the atmospheric pressure in the device once again to an ambient pressure, thereby immersing the sheet into the adhesives for subjecting to the pressure reducing treatment.

Alternatively, the preliminary de-aeration treatment as described above can be carried out by placing a flexible graphite sheet in a vessel, placing the vessel containing the sheet in a pressure reduction device and then keeping the vessel at a reduced pressure by discharging air therein.

Then, liquid adhesives are gradually introduced into the vessel containing the flexible graphite sheet and the degased graphite sheet put under a reduced pressure is impregnated with the liquid adhesives, followed by subjecting to the pressure reducing treatment.

In the case of omitting the preliminary de-aeration, the graphite sheet is directly immersed into the liquid adhesives and then subjected to the pressure reducing treatment.

Subsequent to the immersion step as described above, the graphite sheet impregnated with the solution of the adhesive resin is disposed together with the vessel in the pressure reduction device, followed by de-aeration, and the gaseous components in the adhesives and the graphite sheet are evacuated under a reduced pressure.

As the gasification of low boiling point ingredients in the adhesives begins under a reduced pressure of about 50 mmHg or less, the pressure is once returned to an ambient pressure, followed by pressure reduction. By the operation of returning the atmospheric pressure inside the vessel to the ambient pressure, evacuation of the gases contained in the adhesives and the graphite sheet is promoted. After repeating the de-aeration treatment comprising the steps of the pressure reduction, the return to the ambient pressure and the pressure reduction several times, the graphite sheet is taken out from the pressure reduction device, adhesives deposited on the surfaces of the sheet are removed and then the adhesives are hardened by using a hot press.

The hot press is carried out at 120°-160° C. under a pressure of 0.5 to 1.5 kg/cm$^2$ for 10-60 min and, preferably, at about 140° C. under the pressure of about 1 kg/cm$^2$ for about 20 min.

The flexible graphite sheet reinforced by the process as described above is improved in mechanical strength, for example, bending strength and, particularly, scratch hardness, reduced in the gas permeability, and the sheet swelling thereupon as described above due to the invention of liquid such as methanol occurs scarcely as described in the example shown below. Specifically, the reinforced flexible graphite sheet according to the present invention has a tensile strength of 0.5 to 5 kg/cm$^2$, a gas permeability of $0.2 \times 10^{-5}$ to $1.6 \times 10^{-5}$ cm$^2$/sec.-mmAq and a swelling rate of not more than 6. Material prepared by calcining the flexible graphite sheet having such an excellent performance at a temperature higher than 800° C. is useful as separators for use in fuel cells or the like.

The present invention will now be described more specifically referring to the following non-limitative example. In the example, "gas permeability" is indicated by the permeation amount of oxygen gas as determined under a differential pressure of 1 kg/cm$^2$ and "swelling rate" is indicated by the number of swelled portions which can be visually observed on surfaces of a sheet of $10 \times 10$ (cm) area after immersing the sheet in a methanol solution a whole day and night.

EXAMPLE

Phenolic thermosetting resin adhesives (product No. PL-2801, made by Gunei Kagaku Co., Ltd.) put in a vessel were disposed within a pressure reduction device. Separately, a graphite sheet (GRAFOIL ®, made by Union Carbide Co., Ltd.) was disposed in the same pressure reduction device.

A pressure inside the device was reduced by evacuation using a vacuum pump to about 50 Torr. About one minute after the evacuation, the low boiling point ingredients in the adhesives began to vaporize. At this point, an atmospheric pressure in the device was once returned to the ambient pressure and the degased sheet was completely immersed in the degased adhesive solution.

Then, the pressure inside the device was again reduced to about 50 Torr by the evacuation, the pressure was returned to the ambient pressure when gas bubbles began to evolve from the adhesives and subsequently, the inside pressure of the vessel was reduced again to about 50 Torr. The above-mentioned operation were repeated three times.

Then, the graphite sheet was taken out and the adhesives deposited on the surfaces thereof were removed. Subsequently, the sheet was subjected to hot press at 140° C. under the pressure of 1 kg/cm$^2$ for 20 min.

The physical properties of the thus obtained sheet are shown in the table in comparison with those of the sheet before treatment. The relationship between the content of the phenol in the sheet and the degree of improvement in the tensile strength thereof is shown in FIG. 1.

TABLE
Physical properties of the sheet before and after the treatment according to the present invention

| | Before treatment | After treatment |
|---|---|---|
| Gas permeability (cm$^2$/sec. mm Aq) | $2.88 \times 10^{-5}$ | $1.08 \times 10^{-5}$ |
| Swelling rate (number per 10 cm $\times$ 10 cm) | 120 | 2 |
| Tensile strength (kg/cm$^2$) | 0.28 | 0.91 |
| Weight (g, 10 cm $\times$ 10 cm specimen) | 4.01 | 4.46 |

What is claimed is:

1. A process for preparing a reinforced flexible graphite sheet which comprises:
   (a) subjecting a flexible graphite sheet and a solution of phenolic resin adhesive to preliminary de-aeration treatment in a pressure reduction device;
   (b) immersing the flexible graphite sheet subjected to the preliminary de-aeration treatment into the solution of phenolic resin adhesive subjected to the preliminary de-aeration treatment;
   (c) subjecting the immersed sheet and the adhesive solution to a pressure reducing treatment comprising (i) disposing the graphite sheet impregnated with the adhesive solution together with the vessel containing the adhesive solution in the pressure reduction device, and (ii) subjecting the sheet and solution to subsequent de-aeration treatment;
   (d) taking the graphite sheet out of the pressure reduction device;
   (e) removing adhesive deposited on the surfaces of the sheet; and
   (f) hardening the adhesive using a hot press.

2. The process according to claim 1, wherein the preliminary de-aeration treatment comprises the steps of
   placing the flexible graphite sheet and the vessel containing the solution of phenol resin adhesive separately in the pressure reduction device,
   subjecting the sheet and the solution to de-aeration treatment,
   returning the pressure in the device to ambient pressure,
   immersing the sheet into the adhesive solution, and
   subjecting the sheet and the adhesive solution to the pressure reducing treatment.

3. The process according to claim 1, wherein the preliminary de-aeration treatment comprises the steps of
   placing the flexible graphite sheet in the vessel,
   placing the vessel containing the sheet in the pressure reduction device,
   maintaining the vessel at a reduced pressure by discharging air therein,
   gradually introducing the adhesive solution into the vessel containing the flexible graphite sheet,
   impregnating the degassed graphite sheet, which sheet is under a reduced pressure, with the adhesive solution, and
   subjecting the sheet and the adhesive solution to the pressure reducing treatment.

4. The process according to claim 1, wherein the subsequent de-aeration treatment in the pressure reducing treatment comprises the steps of
   reducing the pressure so that low boiling point ingredients in the adhesive solution begin to gasify,
   returning the pressure to an ambient pressure, and again reducing the pressure,
   which steps are repeated at least once.

5. The process according to claim 1, wherein the phenolic resin adhesive is impregnated in the sheet in an amount of 0.5 to 20% by weight based on the flexible graphite sheet.

6. The process according to claim 1, which comprises further calcinating the thus obtained reinforced flexible graphite sheet at a temperature higher than 800° C. after heat setting.

7. The process according to claim 1, wherein the hot press is carried out at 120°-160° C. under a pressure of 0.5 to 1.5 kg/cm$^2$G for 10-60 min.

* * * * *